United States Patent
Hasegawa et al.

(10) Patent No.: US 11,837,762 B2
(45) Date of Patent: Dec. 5, 2023

(54) FUEL CELL SYSTEM

(71) Applicant: TOYOTA JIDOSHA KABUSHIKI KAISHA, Toyota (JP)

(72) Inventors: Shigeki Hasegawa, Toyota (JP); Motoyuki Kimata, Toyota (JP); Nobukazu Mizuno, Nagakute (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 190 days.

(21) Appl. No.: 17/326,852

(22) Filed: May 21, 2021

(65) Prior Publication Data

US 2021/0376357 A1 Dec. 2, 2021

(30) Foreign Application Priority Data

May 28, 2020 (JP) ................................. 2020-093541

(51) Int. Cl.
*H01M 8/04746* (2016.01)
*H01M 8/04089* (2016.01)
*H01M 8/0438* (2016.01)

(52) U.S. Cl.
CPC ... *H01M 8/04776* (2013.01); *H01M 8/04089* (2013.01); *H01M 8/04395* (2013.01); *H01M 8/04753* (2013.01); *H01M 2250/20* (2013.01)

(58) Field of Classification Search
CPC ........... H01M 8/04089; H01M 8/0432; H01M 8/0438; H01M 8/04395; H01M 8/04753; H01M 8/04776
See application file for complete search history.

(56) References Cited

U.S. PATENT DOCUMENTS

| | | | |
|---|---|---|---|
| 2010/0221630 A1* | 9/2010 | Kajiwara | H01M 8/04753 429/513 |
| 2016/0308228 A1 | 10/2016 | Takahashi | |
| 2019/0088962 A1* | 3/2019 | Chikugo | H01M 8/04753 |
| 2019/0181464 A1 | 6/2019 | Farnsworth et al. | |
| 2019/0181475 A1 | 6/2019 | Farnsworth et al. | |
| 2019/0260047 A1 | 8/2019 | Miyamoto et al. | |

FOREIGN PATENT DOCUMENTS

| | | |
|---|---|---|
| JP | 2016-207292 A | 12/2016 |
| JP | 2019-135716 A | 8/2019 |
| JP | 2019-145357 A | 8/2019 |
| JP | 2019-164987 A | 9/2019 |

* cited by examiner

*Primary Examiner* — Brian R Ohara
*Assistant Examiner* — Brent C Thomas
(74) *Attorney, Agent, or Firm* — Finnegan, Henderson, Farabow, Garrett & Dunner, LLP

(57) ABSTRACT

Provided is a fuel cell system configured to accurately control the gas flow rate and pressure ratio of a turbo-type air compressor. The fuel cell system is a fuel cell system comprising: a fuel cell, an air compressor, an oxidant gas supply flow path, an oxidant gas discharge flow path, an oxidant gas outlet valve, a bypass flow path, a bypass valve, an atmospheric pressure sensor, an outside temperature sensor, a flow rate sensor, a rotational frequency sensor, an angle sensor, a controller, and a calculator configured to estimate the flow resistance Zd, total pressure, partial pressure and energy of each of members that are the air compressor, the oxidant gas outlet valve and the bypass valve.

4 Claims, 4 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane"). Accordingly, the membrane electrode assembly may be referred to as "membrane electrode gas diffusion layer assembly" (MEGA).

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell system which is installed and used in a fuel cell vehicle (hereinafter may be simply referred to as "vehicle").

For example, Patent Literature 1 discloses a fuel cell system such that, when there is a difference between actual and target air flow rates, feedback control is carried out to reduce the difference in air flow rate by changing the opening degree of a regulating valve while maintaining the rotation speed of a compressor.

Patent Literature 2 discloses a method for calculating and estimating the pressure and airflow values of the constituents of a fuel cell circuit by calculating them by a state estimator.

Patent Literature 3 discloses a gas composition estimating method and the estimation of the flow rates of the members of an air supply path.

Patent Literature 4 discloses a method for estimating the amount of air supplied to a fuel cell, by use of the flow passage resistances of an air supply flow passage, an air discharge flow passage and a bypass flow passage, and an air amount obtained by a flow rate sensor.

Patent Literature 1: Japanese Patent Application Laid-Open (JP-A) No. 2016-207292
Patent Literature 2: JP-A No. 2019-164987
Patent Literature 3: JP-A No. 2019-135716
Patent Literature 4: JP-A No. 2019-145357

A turbo-type air compressor which has high pressure ratio dependence on gas flow rate, has the following problem: unless the pressure ratio of the gas inlet and outlet of the air compressor is estimated based on the total pressure, partial pressure, gas flow rate and temperature of each of the members of the air-based system, the gas flow rate of the air compressor and the pressure ratio of the air compressor cannot be accurately controlled.

SUMMARY

The disclosed embodiments were achieved in light of the above circumstances. An object of the disclosed embodiments is to provide a fuel cell system configured to accurately control the gas flow rate and pressure ratio of a turbo-type air compressor.

In a first embodiment, there is provided a fuel cell system comprising:
a fuel cell,
an air compressor configured to supply oxidant gas to the fuel cell,
an oxidant gas supply flow path connecting the fuel cell to the air compressor,
an oxidant gas discharge flow path configured to discharge cathode off-gas, which is discharged from the fuel cell, to the outside,
an oxidant gas outlet valve disposed in the oxidant gas discharge flow path to control pressure of the oxidant gas,
a bypass flow path branching from the oxidant gas supply flow path, bypassing the fuel cell and being connected to the oxidant gas discharge flow path,
a bypass valve disposed in the bypass flow path to control an opening state of the bypass flow path,
an atmospheric pressure sensor configured to measure atmospheric pressure,
an outside temperature sensor configured to measure outside temperature,
a flow rate sensor configured to measure a flow rate of the oxidant gas supplied from the outside to an inlet of the air compressor,
a rotational frequency sensor configured to measure a rotational frequency of the air compressor,
an angle sensor configured to measure an opening degree of each of the valves that are the oxidant gas outlet valve and the bypass valve,
a controller, and
a calculator configured to estimate a flow resistance Zd, total pressure, partial pressure and energy of each of members that are the air compressor, the oxidant gas outlet valve and the bypass valve,
wherein the calculator performs:
a step 1 in which the calculator calculates the flow resistance Zd (Pa/(mol/sec)) of each of the members by a predetermined first calculation formula obtained by linearization of a relationship between a flow rate ndot (mol/sec) and a differential pressure $\Delta P$ (Pa) of each of the members, from the flow rate of the oxidant gas measured by the flow rate sensor, the atmospheric pressure measured by the atmospheric pressure sensor, the rotational frequency of the air compressor measured by the rotational frequency sensor, and the opening degree of each of the valves that are the oxidant gas outlet valve and the bypass valve measured by the angle sensor;

a step 2 in which, after the step 1, the calculator calculates the total pressure of each of the members by a predetermined second calculation formula for total pressure calculation, from the flow resistance Zd of each of the members, the flow rate of the oxidant gas measured by the flow rate sensor, the atmospheric pressure measured by the atmospheric pressure sensor, and the outside temperature measured by the outside temperature sensor;

a step 3 in which, after the step 2, the calculator calculates the partial pressure of each of the members by a predetermined third calculation formula for partial pressure calculation, from the total pressure of each of the members calculated in the step 2 and a ratio of each of components contained in the oxidant gas; and a step 4 in which, after the step 3, the calculator calculates the energy of each of the members by a predetermined fourth calculation formula for energy calculation, from the flow rate of the oxidant gas measured by the flow rate sensor, the atmospheric pressure measured by the atmospheric pressure sensor, and the outside temperature measured by the outside temperature sensor.

In the step 1, the calculator may calculate an effective gas transport coefficient, and in the step 2, when the differential pressure ΔP (Pa) of each of the members is equal to or less than a predetermined threshold value, the calculator may calculate the total pressure of each of the members from a value obtained by multiplying the effective gas transport coefficient by a correction coefficient, the flow rate of the oxidant gas measured by the flow rate sensor, the atmospheric pressure measured by the atmospheric pressure sensor, and the outside temperature measured by the outside temperature sensor.

In the step 1, when the opening degree of each of the valves that are the oxidant gas outlet valve and the bypass valve measured by the angle sensor is equal to or less than a predetermined threshold value, the calculator may zero the effective gas transport coefficient of the valves that the opening degree is equal to or less than the predetermined threshold value.

The calculator may correct a partial pressure calculation result of each of the members calculated in the step 3 for a value obtained by multiplying a total pressure calculation result of each of the members calculated in the step 2 by a mole fraction of each of the components of the oxidant gas.

The fuel cell system may further comprise an intercooler between the air compressor of the oxidant gas supply flow path and the fuel cell, and the calculator may estimate a flow resistance Zd, total pressure, partial pressure and energy of each of members that are the intercooler, the air compressor, the oxidant gas outlet valve and the bypass valve.

According to the fuel cell system of the disclosed embodiments, the gas flow rate and pressure ratio of the turbo-type air compressor can be accurately controlled.

BRIEF DESCRIPTION OF THE DRAWINGS

In the accompanying drawings.

DETAILED DESCRIPTION

Figure 1:
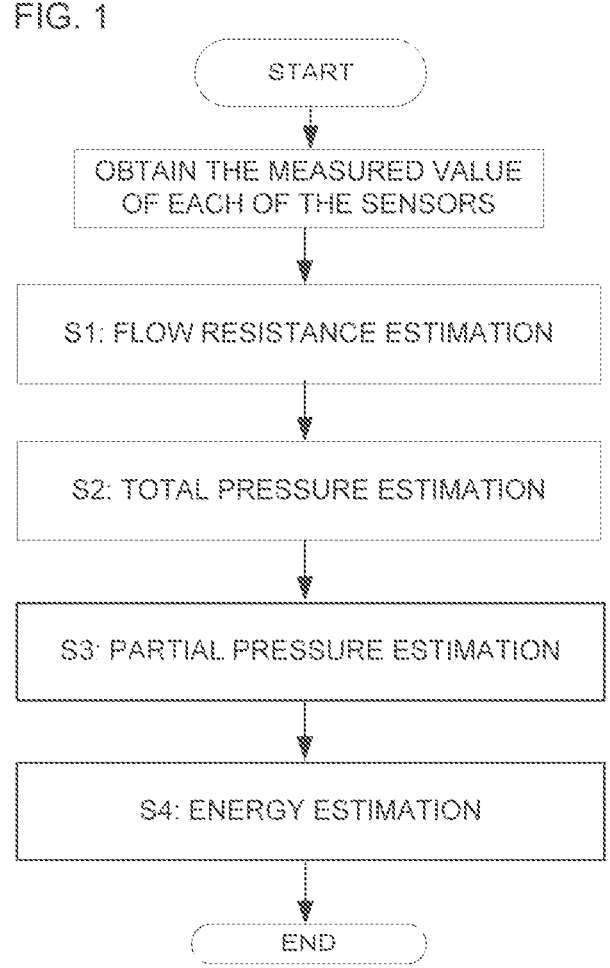
FIG. 1 is the flow chart of an example of the calculation process that is carried out by the calculator of the fuel cell system of the disclosed embodiments.

The fuel cell system of the disclosed embodiments is a fuel cell system comprising:
a fuel cell,
an air compressor configured to supply oxidant gas to the fuel cell,
an oxidant gas supply flow path connecting the fuel cell to the air compressor,
an oxidant gas discharge flow path configured to discharge cathode off-gas, which is discharged from the fuel cell, to the outside,
an oxidant gas outlet valve disposed in the oxidant gas discharge flow path to control pressure of the oxidant gas,
a bypass flow path branching from the oxidant gas supply flow path, bypassing the fuel cell and being connected to the oxidant gas discharge flow path,
a bypass valve disposed in the bypass flow path to control an opening state of the bypass flow path,
an atmospheric pressure sensor configured to measure atmospheric pressure,
an outside temperature sensor configured to measure outside temperature,
a flow rate sensor configured to measure a flow rate of the oxidant gas supplied from the outside to an inlet of the air compressor,
a rotational frequency sensor configured to measure a rotational frequency of the air compressor,
an angle sensor configured to measure an opening degree of each of the valves that are the oxidant gas outlet valve and the bypass valve,
a controller, and
a calculator configured to estimate a flow resistance Zd, total pressure, partial pressure and energy of each of members that are the air compressor, the oxidant gas outlet valve and the bypass valve,
wherein the calculator performs:
a step 1 in which the calculator calculates the flow resistance Zd (Pa/(mol/sec)) of each of the members by a predetermined first calculation formula obtained by linearization of a relationship between a flow rate ndot (mol/sec) and a differential pressure ΔP (Pa) of each of the members, from the flow rate of the oxidant gas measured by the flow rate sensor, the atmospheric pressure measured by the atmospheric pressure sensor, the rotational frequency of the air compressor measured by the rotational frequency sensor, and the opening degree of each of the valves that are the oxidant gas outlet valve and the bypass valve measured by the angle sensor;
a step 2 in which, after the step 1, the calculator calculates the total pressure of each of the members by a predetermined second calculation formula for total pressure calculation, from the flow resistance Zd of each of the members, the flow rate of the oxidant gas measured by the flow rate sensor, the atmospheric pressure measured by the atmospheric pressure sensor, and the outside temperature measured by the outside temperature sensor;

a step 3 in which, after the step 2, the calculator calculates the partial pressure of each of the members by a predetermined third calculation formula for partial pressure calculation, from the total pressure of each of the members calculated in the step 2 and a ratio of each of components contained in the oxidant gas; and a step 4 in which, after the step 3, the calculator calculates the energy of each of the members by a predetermined fourth calculation formula for energy calculation, from the flow rate of the oxidant gas measured by the flow rate sensor, the atmospheric pressure measured by the atmospheric pressure sensor, and the outside temperature measured by the outside temperature sensor.

When a turbo-type air compressor is used as the air compressor for the purpose of cost and size reduction, the pressure ratio dependence of the gas flow rate increases. As a result, if the rotational frequency of the air compressor and the pressure ratio between the gas inlet and outlet of the air compressor are not accurately controlled, the gas flow rate controllability deteriorates. When the surge region (low gas flow rate and high pressure ratio) which is specific to the turbo-type air compressor is used, there is a problem in that the durability of the members decreases (e.g., damage to the members such as an impeller) due to the vibration of the air compressor.

When a Roots-type air compressor is used as the air compressor, the gas flow rate can be controlled by controlling its rotational frequency, and the gas pressure can be controlled by controlling the angle of the gas outlet valve, whereby each of the gas flow rate and gas pressure of the air compressor can be independently controlled.

Accordingly, the prior-art control based on the Roots-type air compressor that is independent from the pressure ratio, has the following problems: a deterioration in gas flow rate and gas pressure controllability, a deterioration in drivability, a reduction in the durability of the members, etc.

According to the disclosed embodiments, the ever-changing internal state (gas flow rate, total pressure, partial pressure and energy) of the air-based system of the fuel cell system is estimated by use of a predetermined physical model, and the pressure ratio of the air compressor is accurately estimated, whereby the controllability of a gas flow rate command value and a gas pressure command value can be increased, and a deterioration in drivability and a reduction in the durability of the members can be suppressed.

According to the disclosed embodiments, by calculating the total pressure, partial pressure and energy of each of the members of the air-based system in order of increasing physical change rate, errors arising from calculation delay can be minimized, and the gas flow rate and pressure ratio of the turbo-type air compressor can be accurately controlled. Also, since the calculation formula of the flow resistance is linearized, calculation load on the calculator can be reduced.

The fuel cell system of the disclosed embodiments includes at least the fuel cell, the air compressor, the oxidant gas supply flow path, the oxidant gas discharge flow path, the oxidant gas outlet valve, the bypass flow path, the bypass valve, the atmospheric pressure sensor, the outside temperature sensor, the flow rate sensor, the rotational frequency sensor, the angle sensor, the controller and the calculator. It may further include the intercooler, an oxidant gas inlet valve, a fuel gas pressure sensor, a torque sensor, etc.

In the disclosed embodiments, the term "each of members" or "each of the members" includes at least the air compressor, the oxidant gas outlet valve and the bypass valve. As needed, it may further include an oxidant gas inlet hole, an oxidant gas cleaner (filter), the oxidant gas supply flow path, the intercooler, the oxidant gas inlet valve, a cathode inlet manifold, the cathode of the fuel cell, a cathode outlet manifold, the bypass flow path, a junction of the oxidant gas discharge flow path and a fuel off-gas discharge valve, the oxidant gas discharge flow path, etc.

In general, the fuel cell system of the disclosed embodiments is installed and used in a fuel cell vehicle that uses a motor as a driving source.

The fuel cell system of the disclosed embodiments may be installed and used in a vehicle that can be run by the power of the secondary cell.

The motor is not particularly limited. It may be a conventionally-known motor.

The fuel cell may be a fuel cell stack composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a refrigerant flow path for keeping the fuel cell temperature at a constant level.

The separators may have supply and discharge holes for delivering the reaction gas and the refrigerant in the unit cell stacking direction.

As the supply hole, examples include, but are not limited to, a fuel gas supply hole, an oxidant gas supply hole and a refrigerant supply hole.

As the discharge hole, example include, but are not limited to, a fuel gas discharge hole, an oxidant gas discharge hole and a refrigerant discharge hole.

The separators may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separators may have a current collection function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel cell system may include the fuel gas supplier for supplying fuel gas to the fuel electrode of the fuel cell.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel cell system may include a fuel gas supply flow path.

The fuel gas supply flow path connects the fuel cell to the fuel gas supplier and enables the supply of fuel gas from the fuel gas supplier to the fuel electrode of the fuel cell.

The fuel cell system may include a circulation flow path.

The circulation flow path enables that fuel off-gas discharged from the fuel electrode of the fuel cell is recovered and returned as circulation gas to the fuel electrode of the fuel cell.

The fuel off-gas contains the following, for example: fuel gas which passed through the fuel electrode while remaining unreacted, moisture which is water generated at the oxidant electrode and delivered to the fuel electrode, and oxidant gas which may be supplied to the fuel electrode during a purge.

As needed, the circulation flow path of the fuel cell system may be provided with an ejector, a circulation pump for controlling the flow rate of the circulation gas (such as a hydrogen pump), etc.

The circulation pump may be electrically connected to the controller, and the flow rate of the circulation gas may be controlled by controlling the turning on/off, rotational frequency, etc., of the circulation pump by the controller.

The ejector is disposed at the junction of the fuel gas supply flow path and the circulation flow path, for example. It supplies mixed gas containing the fuel gas and the circulation gas to the fuel electrode of the fuel cell. As the ejector, a conventionally-known ejector may be used.

The circulation flow path may be provided with a gas-liquid separator for reducing the moisture in the fuel off-gas. Also, the circulation flow path may be provided with a water discharge flow path that branches from the circulation flow path by the gas-liquid separator. The water discharge flow path may be provided with a water discharge valve.

The moisture separated from the fuel off-gas in the gas-liquid separator may be discharged by opening the water discharge valve of the water discharge flow path branching from the circulation flow path.

The water discharge valve may be electrically connected to the controller, and the amount of discharged liquid water may be controlled by controlling the opening and closing of the water discharge valve by the controller.

The fuel cell system may include a fuel off-gas discharger.

The fuel off-gas discharger enables the discharge of the fuel off-gas to the outside (the outside of the system). The outside may be the outside of the fuel cell system, or it may be the outside of the vehicle.

The fuel off-gas discharger may include the fuel off-gas discharge valve. As needed, it may further include a fuel off-gas discharge flow path.

The fuel off-gas discharge valve may be electrically connected to the controller, and the fuel off-gas discharge flow amount may be controlled by controlling the opening and closing of the fuel off-gas discharge valve by the controller.

The fuel off-gas discharge flow path may branch from the circulation flow path, for example. It enables the discharge of the fuel off-gas to the outside when the concentration of hydrogen in the fuel off-gas is too low.

The fuel cell system may include the air compressor as the oxidant gas supplier, the oxidant gas supply flow path, and the oxidant gas discharge flow path.

The air compressor may be the turbo-type air compressor.

The air compressor supplies oxidant gas to at least the oxidant electrode of the fuel cell.

The air compressor is driven by a control signal from the controller and introduces the oxidant gas to the cathode side (such as the oxidant electrode and the cathode inlet manifold) of the fuel cell.

The oxidant gas is oxygen-containing gas. It may be air, dry air, pure oxygen or the like.

The oxidant gas supply flow path connects the oxidant gas inlet hole and the air compressor to the fuel cell and enables the supply of oxidant gas from the air compressor to the oxidant electrode of the fuel cell.

The oxidant gas cleaner (filter) may be disposed between the oxidant gas inlet hole of the oxidant gas supply flow path and the air compressor. The oxidant gas cleaner may remove impurities from the oxidant gas drawn through the oxidant gas inlet hole. As the oxidant gas cleaner, for example, a conventionally-known filter may be used.

As an oxidant gas pressure control valve, the oxidant gas inlet valve may be disposed between the air compressor of the oxidant gas supply flow path and the fuel cell.

The oxidant gas inlet valve is electrically connected to the controller. By controlling the opening degree of the oxidant gas inlet valve by the controller, the pressure of the oxidant gas supplied to the oxidant electrode (cathode pressure) can be controlled.

The oxidant gas discharge flow path enables the discharge of the oxidant gas from the oxidant electrode of the fuel cell.

The oxidant gas discharge flow path may be provided with the oxidant gas outlet valve as the oxidant gas pressure control valve.

The oxidant gas outlet valve is electrically connected to the controller. By opening the oxidant gas outlet valve by the controller, reacted cathode off-gas is discharged from the oxidant gas discharge flow path. By controlling the opening degree of the oxidant gas outlet valve, the pressure of the oxidant gas supplied to the oxidant electrode (cathode pressure) can be controlled.

In the case where the oxidant gas inlet valve is disposed, when the oxidant gas inlet and outlet valves are closed, the pressure of the fuel cell depends on the pressure of the fuel gas supplied from the fuel gas supplier. Accordingly, the fuel cell system of the disclosed embodiments may include the fuel gas pressure sensor so that the calculator can estimate the flow resistance, total pressure, partial pressure and energy of each of the members.

The fuel gas pressure sensor is electrically connected to the controller. The controller detects the fuel gas pressure output from the fuel gas pressure sensor. The controller may output the detected fuel gas pressure to the calculator.

The fuel gas pressure sensor may be a conventionally-known pressure sensor, etc.

The intercooler may be disposed between the air compressor of the oxidant gas supply flow path and the fuel cell. When the fuel cell system includes the oxidant gas inlet valve, the intercooler may be disposed between the air compressor of the oxidant gas supply flow path and the oxidant gas inlet valve. The intercooler is connected to a refrigerant circulation flow path to exchange heat with the refrigerant and cool down the oxidant gas discharged from the oxidant gas supplier. When it is required to warm up the fuel cell (a power generation pretreatment), the oxidant gas is compressed by the oxidant gas supplier to increase the temperature thereof, and the temperature of the refrigerant is increased by the heat of the oxidant gas.

The fuel cell system may include the bypass flow path which branches from the oxidant gas supply flow path at the downstream side of the air compressor of the oxidant gas supply flow path or at the downstream side of the intercooler when the fuel cell system includes the intercooler, bypasses the fuel cell, and then is connected to the oxidant gas discharge flow path. The bypass flow path is provided with the bypass valve for controlling the opening state of the bypass flow path. The bypass valve is electrically connected to the controller, and it is opened by the controller when the power of the secondary cell is consumed by driving the oxidant gas supplier in the state where, for example, the charge capacity of the secondary cell is not sufficient at the time of regenerative power generation by the drive motor. Accordingly, the oxidant gas is discharged into the oxidant gas discharge flow path and is not delivered to the fuel cell.

The fuel gas supply flow path and the oxidant gas supply flow path may be connected via a joining flow path. The joining flow path may be provided with a purge valve.

The purge valve may be electrically connected to the controller, and by opening the purge valve by the controller, the oxidant gas in the oxidant gas supplier may be allowed to flow into the fuel gas supply flow path as purge gas.

The purge gas is used for purging, and it may be reaction gas. The reaction gas may be fuel gas, oxidant gas or mixed reaction gas containing them.

The fuel cell system may include a refrigerant supplier and a refrigerant circulation flow path as the cooling system of the fuel cell.

The refrigerant circulation flow path communicates between the refrigerant supply hole and refrigerant discharge hole installed in the fuel cell, circulates the refrigerant supplied from the refrigerant supplier in and out of the fuel cell, and enables the cooling of the fuel cell.

As the refrigerant supplier, examples include, but are not limited to, a cooling water pump.

The refrigerant circulation flow path may be provided with a radiator for heat dissipation from cooling water.

As the cooling water (refrigerant), for example, a mixed solution of ethylene glycol and water may be used to prevent freezing at low temperature.

The fuel cell system may include the secondary cell.

The secondary cell (battery) needs to be a chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the air compressor, etc. The secondary cell may be chargeable by a power source outside the vehicle, such as a household power source. The secondary cell may be charged by the output power of the fuel cell.

The controller may manage the state-of-charge (SOC) value of the secondary cell and may control the charge and discharge of the secondary cell.

The state of charge (SOC) value means the percentage of the charge capacity with respect to the full charge capacity of the secondary cell. The full charge capacity is a SOC of 100%.

The fuel cell system may include an auxiliary instrument that uses the battery as a power source.

As the auxiliary instrument, examples include, but are not limited to, a lighting instrument for vehicles and an air-conditioning instrument for vehicles.

The atmospheric pressure sensor measures atmospheric pressure.

The atmospheric pressure sensor is electrically connected to the controller. The controller detects the atmospheric pressure output from the atmospheric pressure sensor. The controller may output the detected atmospheric pressure to the calculator.

The atmospheric pressure sensor may be a conventionally-known pressure sensor, etc.

The outside temperature sensor measures outside temperature.

The outside temperature sensor is electrically connected to the controller. The controller detects the outside temperature output from the outside temperature sensor. The controller may output the detected outside temperature to the calculator.

The outside temperature sensor may be a conventionally-known temperature sensor, etc.

The flow rate sensor measures the flow rate of the oxidant gas supplied from the outside to the inlet of the air compressor. The flow rate measured by the flow rate sensor may be the molar flow rate of the oxidant gas, may be the mass flow rate of the oxidant gas, or may be both of them.

The flow rate sensor is electrically connected to the controller. The controller detects the flow rate output from the flow rate sensor. The controller may output the detected flow rate to the calculator.

The flow rate sensor may be a conventionally-known flow rate sensor, etc.

The torque sensor measures a torque amount input to the air compressor.

The torque sensor is electrically connected to the controller. The controller detects the torque amount output from the torque sensor. The controller may output the detected torque amount to the calculator.

The torque sensor may be a conventionally-known torque sensor, etc.

The rotational frequency sensor measures the rotational frequency of the air compressor.

The rotational frequency sensor is electrically connected to the controller. The controller detects the rotational frequency of the air compressor output from the rotational frequency sensor. The controller may output the detected rotational frequency to the calculator.

The rotational frequency sensor may be a conventionally-known rotational frequency sensor, etc.

The angle sensor measures the opening degree of each of the valves that are the oxidant gas outlet valve and the bypass valve. When the fuel cell system includes the oxidant gas inlet valve, the angle sensor measures the opening degree of the oxidant gas inlet valve.

The angle sensor is electrically connected to the controller. The controller detects the opening degree of each of the valves output from the angle sensor. The controller may output the detected opening degree of each of the valves to the calculator.

The angle sensor may be a conventionally-known angle sensor, etc.

The controller controls the fuel cell system. The controller controls the air compressor, the opening degree of the oxidant gas inlet valve, the opening degree of the oxidant gas outlet valve, the opening degree of the bypass valve, etc.

The controller may be connected to the atmospheric pressure sensor, the outside temperature sensor, the flow rate sensor, the torque sensor, the rotational frequency sensor, the angle sensor, the fuel gas pressure sensor, the calculator, the oxidant gas inlet valve, the oxidant gas outlet valve, the bypass valve, the gas-liquid separator, the water discharge valve, the fuel off-gas discharge valve, the purge valve, the fuel gas supplier, the oxidant gas supplier, the secondary cell, the circulation pump and so on through an input-output interface. Also, the controller may be electrically connected to the ignition switch that may be installed in the vehicle.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an engine control unit (ECU).

The calculator estimates the flow resistance Zd, total pressure, partial pressure and energy of at least each of the members that are the air compressor, the oxidant gas outlet valve and the bypass valve. As needed, it further estimates the flow resistance Zd, total pressure, partial pressure and energy of each of the following members: the oxidant gas inlet hole, the oxidant gas cleaner (filter), the oxidant gas supply flow path, the intercooler, the oxidant gas inlet valve, the cathode inlet manifold, the cathode of the fuel cell, the cathode outlet manifold, the bypass flow path, the junction of the oxidant gas discharge flow path and the fuel off-gas discharge valve, the oxidant gas discharge flow path, etc.

FIG. 1 is the flow chart of an example of the calculation process that is carried out by the calculator of the fuel cell system of the disclosed embodiments.

As shown in FIG. 1, the calculator obtains the measured value of each of the sensors, and it estimates the flow resistance, total pressure, partial pressure and energy of each of the members of the air-based system in this order.

Accordingly, it is possible to accurately estimate the ever-changing state quantity (flow resistance, total pressure, partial pressure and energy) of each of the members of the air-based system of the fuel cell system, without actually measuring them. In addition, the number of installed measurement sensors can be decreased, and the cost of the air-based system can be reduced.

The term "each of sensors" or "each of the sensors" includes at least the atmospheric pressure sensor, the outside temperature sensor, the flow rate sensor, the rotational frequency sensor and the angle sensor. As needed, it may further include the fuel gas pressure sensor, the torque sensor, etc.

[Step 1 (S1): Flow Resistance Estimation]

The calculator obtains the flow rate of the oxidant gas measured by the flow rate sensor, the atmospheric pressure measured by the atmospheric pressure sensor, the rotational frequency of the air compressor measured by the rotational frequency sensor, and the opening degree of each of the valves that are the oxidant gas outlet valve and the bypass valve measured by the angle sensor.

From them, the calculator calculates the flow resistance Zd (Pa/(mol/sec)) of each of the members by the predetermined first calculation formula obtained by linearization of the relationship between the flow rate ndot (mol/sec) and the differential pressure (pressure loss) $\Delta P$ (Pa) of each of the members.

By estimating the flow resistance of each of the members of the air-based system, it is possible to estimate how much pressure loss is caused to each of the members when the gas flow rate command value is fed to the air-based system. Accordingly, it is possible to accurately estimate the pressure ratio of the air compressor.

The calculator may calculate the effective gas transport coefficient from the flow resistance Zd. The effective gas transport coefficient may be a value obtained by considering a gas transport coefficient, which is the reciprocal of the flow resistance Zd, in combination with the number of the gas inlet and discharge holes of each of the members.

The flow resistance Zd (Pa/(mol/sec)) may be the value obtained by multiplying the pressure loss $\Delta P$ (Pa) by the gas flow rate ndot (mol/sec).

For example, the first calculation formula may be the following formula (1), which is a formula obtained by referring to and linearization of the Darcy Weisbach equation (a theoretical equation that gives a pressure loss).

$$\text{Flow resistance } Zd(\text{Pa}/(\text{mol/sec})) = \Delta P(\text{Pa}) \times n\text{dot}(\text{mol/sec}) \quad \text{Formula (1)}$$

The pressure loss $\Delta P$ of each of the members may be estimated as follows. A data group showing the relationship between the atmospheric pressure, the rotational frequency of the air compressor, the opening degree of the oxidant gas outlet valve, the opening degree of the bypass valve and, as needed, the opening degree of the oxidant gas inlet valve is prepared in advance, and the measured value is checked with the data group, thereby estimating the pressure loss $\Delta P$ of each of the members.

The flow rate (molar flow rate) ndot of the gas of each of the members may be estimated as follows, for example. A data group showing the relationship between the molar flow rate of the oxidant gas drawn into the air compressor and the molar flow rate of the oxidant gas of each of the members, is prepared in advance, and the flow rate of the oxidant gas measured by the flow rate sensor is checked with the data, thereby estimating the flow rate (molar flow rate) ndot of the gas of each of the members.

[Step 2 (S2): Total Pressure Estimation]

After the step 1, the calculator calculates the total pressure of each of the members by the predetermined second calculation formula for total pressure calculation, from the flow resistance Zd of each of the members, the flow rate of the oxidant gas measured by the flow rate sensor, the atmospheric pressure measured by the atmospheric pressure sensor, and the outside temperature measured by the outside temperature sensor.

The second calculation formula may be the following formula (2), which is an equation of the state of gas.

$$P_{total}=nRT/V \qquad \text{Formula (2)}$$

The mole n of the oxidant gas may be estimated from the flow rate of the oxidant gas measured by the flow rate sensor.

The temperature T may be the outside temperature measured by the outside temperature sensor.

The volume V may be obtained from the volume of each of the members, the product of cross-sectional area and flow path length, etc. It may be calculated in advance.

The total pressure of each of the members obtained by the second calculation formula may be multiplied by the effective gas transport coefficient. The value thus obtained may be employed as the total pressure.

Figure 2:
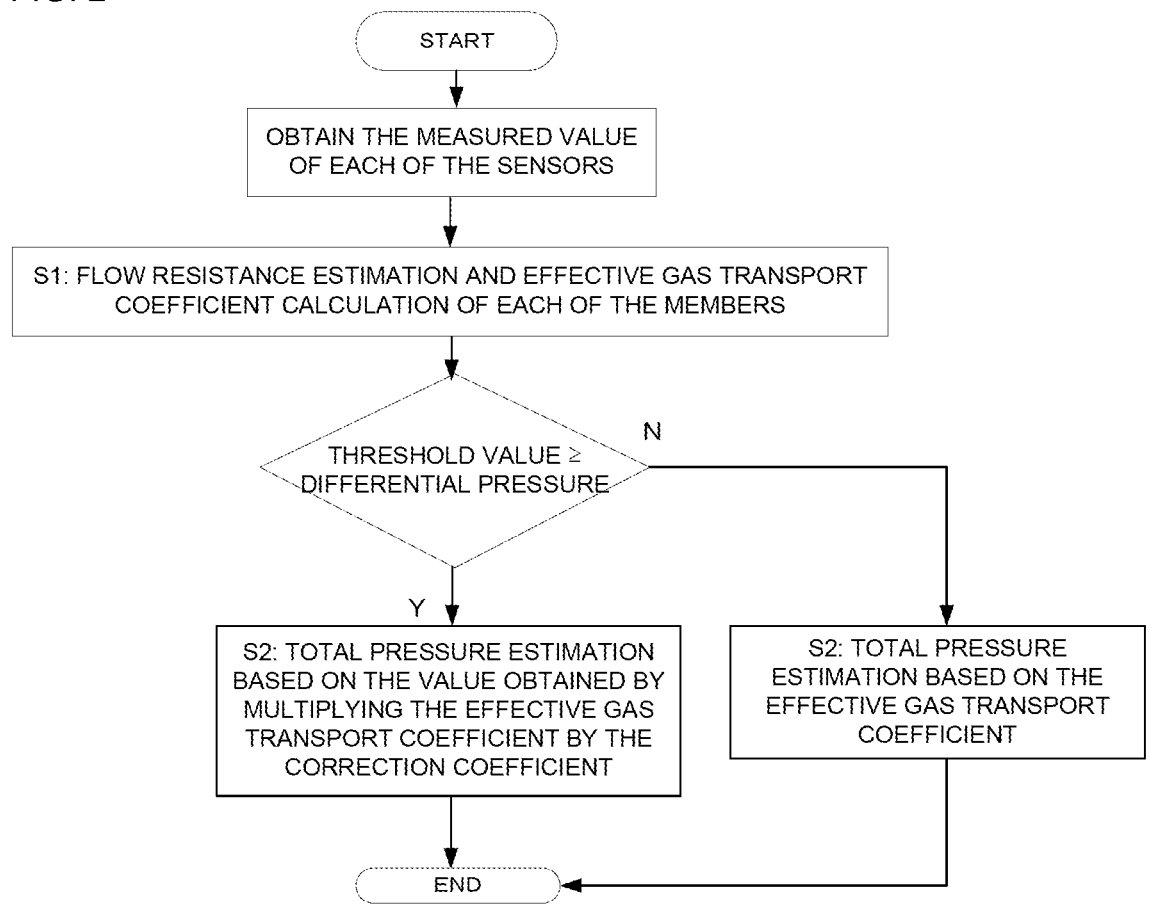
FIG. 2 is the flow chart of an example of the method for controlling the fuel cell system of the disclosed embodiments.

FIG. 2 is the flow chart of an example of the method for controlling the fuel cell system of the disclosed embodiments.

As shown in FIG. 2, when the differential pressure (pressure loss) ΔP (Pa) between the inlet and outlet of each of the members is equal to or less than the predetermined threshold value, the calculator calculates the total pressure using the value obtained by multiplying the effective gas transport coefficient by the correction coefficient.

In the step 2, when the differential pressure ΔP (Pa) of each of the members is equal to or less than the predetermined threshold value, the calculator calculates the total pressure of each of the members from the value obtained by multiplying the effective gas transport coefficient by the correction coefficient, the flow rate of the oxidant gas measured by the flow rate sensor, the atmospheric pressure measured by the atmospheric pressure sensor, and the outside temperature measured by the outside temperature sensor.

When the differential pressure of each of the members of the air-based system is minimum, the effective gas transport coefficient is corrected by multiplying the effective gas transport coefficient by the correction coefficient.

The predetermined threshold value of the differential pressure is not particularly limited. The differential pressure during the time the air compressor is stopped, the differential pressure before the air-based system is started, etc., may be determined as the predetermined threshold value.

The correction coefficient may be determined as follows. A data group showing the relationship between the differential pressure and numerical oscillation when the differential pressure is equal to or less than the predetermined threshold value, is prepared in advance, and the correction coefficient may be appropriately determined from the data group.

The following phenomenon occurs when the differential pressure of each of the members is minimum (for example, the differential pressure is 10 Pa or less during the time the air compressor is stopped, before the air-based system is started, etc.): a numerical oscillation in which the gas flow direction of each of the members repeats favorable and adverse currents, is induced and results in unstable calculation. Accordingly, when the differential pressure is minimum, the calculational instability due to the numerical oscillation may be suppressed by multiplying the effective gas transport coefficient by the correction coefficient to decay the numerical oscillation.

Figure 3:
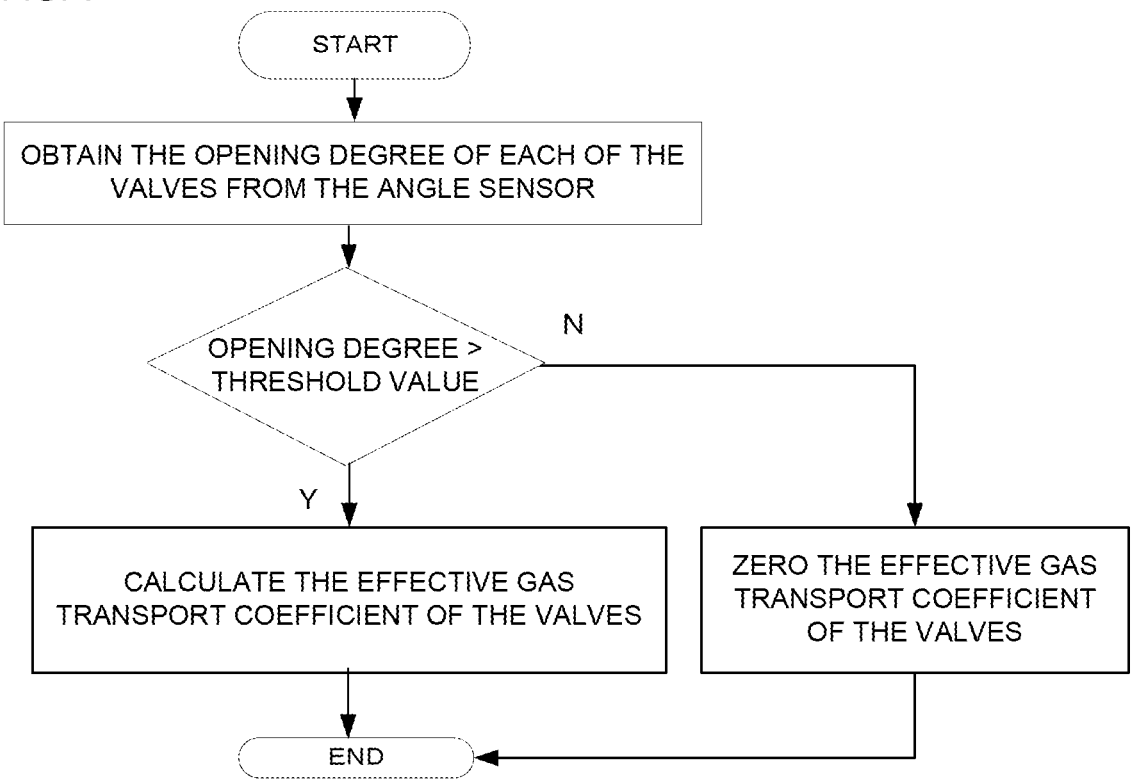
FIG. 3 is the flow chart of another example of the method for controlling the fuel cell system of the disclosed embodiments.

FIG. 3 is the flow chart of another example of the method for controlling the fuel cell system of the disclosed embodiments.

As shown in FIG. 3, in the step 1, when the opening degree of each of the valves that are the oxidant gas outlet valve and the bypass valve measured by the angle sensor is equal to or less than the predetermined threshold value, the calculator may zero the effective gas transport coefficient of the valves that the opening degree is equal to or less than the predetermined threshold value.

When the opening degree of the oxidant gas outlet valve and the opening degree (sensor angle) of the bypass valve are a small angle (e.g., 0.5°) each, the valves of the fuel cell system are actually closed. However, since the calculator estimates that the valves are opened at a small angle, there is a decrease in calculation accuracy. Accordingly, when the sensor angle is equal to or less than the predetermined threshold value, the valves are considered to be closed, and the effective transport coefficient between adjacent functional blocks is determined to be 0 to prevent mass transfer calculation. Accordingly, it is possible to suppress the destabilization of calculation when the valves are opened at a small angle. In the case where the fuel cell system includes the oxidant gas inlet valve, when the opening degree of each of the valves that are the oxidant gas inlet valve, the oxidant gas outlet valve and the bypass valve measured by the angle sensor is equal to or less than the predetermined threshold value, the calculator may zero the effective gas transport coefficient of the valves that the opening degree is equal to or less than the predetermined threshold value.

[Step 3 (S3): Partial Pressure Estimation]

After the step 2, the calculator calculates the partial pressure of each of the members by the predetermined third calculation formula for partial pressure calculation, from the total pressure of each of the members calculated in the step 2 and the ratio of each of the components contained in the oxidant gas.

The third calculation formula may be the relation of the total pressure of each of the members and the product of the ratio of each of the components with respect to all the components contained in the oxidant gas when all the components are determined as 100%. For example, it may be the following formula (3).

$$\text{Partial pressure of each of the components of each of the members} = \text{Total pressure} \times (\text{Ratio of each of the components}/100) \qquad \text{Formula (3)}$$

The ratio of the components contained in the oxidant gas may be obtained in advance.

The main components of the oxidant gas may be hydrogen, nitrogen, oxygen, water vapor, etc. The partial pressure of each of the components of the oxidant gas may be calculated from the composition ratio of the main components.

In the step 3 of the disclosed embodiments, each partial pressure calculation result calculated in the step 3 may be corrected for the value obtained by multiplying the total pressure calculation result of each of the members calculated in the step 2 by the mole fraction of each of the components (oxygen, hydrogen, nitrogen and water vapor) of the oxidant gas, in order not to create a difference between the total pressure of each of the members calculated in the step 2 and the total value (total pressure) of the partial pressures calculated in the step 3.

This correction may be carried out by the following method, for example.

Based on the partial pressure calculation result, the mole fraction of each of the components of the oxidant gas (oxygen, hydrogen, nitrogen and water vapor) is calculated. The partial pressure calculation result handles the mole fraction as positive. Then, the partial pressure calculation result may be updated by multiplying the total pressure calculation result (total pressure (array_P_tot)) by the above-obtained mole fraction of each of the components (array_x_$O_2$, array_x_$H_2$, array_x_$N_2$ and array_x_$H_2$Ovap).

The partial pressure of the air-based system is the partial pressure (oxygen 21% and nitrogen 79%) in the atmosphere until the inlet of the fuel cell stack. Due to water generation resulting from the power generation of the fuel cell stack, the partial pressure of the downstream flow path of the fuel cell stack differs from the partial pressure in the atmosphere. Accordingly, the estimation accuracy of the partial pressure passing through the members disposed at the downstream flow path of the fuel cell stack, especially the oxidant gas outlet valve, is increased; the gas flow rate and the gas pressure controllability are increased; and a deterioration in drivability and a reduction in the durability of the members can be suppressed.

When there is a difference between the result of the total pressure of each of the members and the result of the partial pressure of each of the members, there is a possibility that the partial pressure calculation was not correctly carried out, and the partial pressure of a specific gas species was estimated abnormally large or small. Accordingly, a deterioration in the calculational stability of the partial pressure calculation can be suppressed by correcting the partial pressure calculation result based on the total pressure calculation result.

[Step 4 (S4): Energy Estimation]

After the step 3, the calculator calculates the energy of each of the members by the predetermined fourth calculation formula for energy calculation, from the flow rate of the oxidant gas measured by the flow rate sensor, the atmospheric pressure measured by the atmospheric pressure sensor, and the outside temperature measured by the outside temperature sensor. From the calculated energy of each of the members, based on the total pressure, gas flow rate and partial pressure of each of the members, the temperature of each of the members may be estimated. Also, the temperature may be estimated as follows. A data group showing the relationship between the energy and the temperature is prepared in advance, and the energy is checked with the data group, thereby estimating the temperature.

The fourth calculation formula may be the following formula (4), for example.

$$\text{Energy } \Delta q(W) = \text{Mass flow rate} \times \text{Specific heat } Cp \times \text{Temperature } T \times \text{Differential pressure } PR^{((\gamma-1)/\gamma-1)}/\text{Adiabatic compression efficiency } \eta \quad \text{Formula (4)}$$

In the formula (4), γ is specific heat ratio, and the differential pressure PR is the ratio of discharge pressure to inlet pressure.

The mass flow rate may be calculated from the flow rate sensor.

The temperature T may be calculated from the outside temperature sensor.

The differential pressure PR may be estimated as follows, for example. A data group showing the relationship between the atmospheric pressure, the rotational frequency of the air compressor, the opening degree of the oxidant gas outlet valve, the opening degree of the bypass valve and, as needed, the torque amount input to the air compressor, is prepared, and the measured value is checked with the data group, thereby estimating the differential pressure PR.

For the specific heat Cp and the specific heat ratio γ, the specific heat of the oxidant gas may be measured in advance.

For the adiabatic compression efficiency η, the adiabatic compression efficiency of each of the members may be calculated in advance.

In the disclosed embodiments, the intercooler may be further disposed between the air compressor of the oxidant gas supply flow path and the fuel cell (or the oxidant gas inlet valve), and the calculator may estimate the flow resistance Zd, total pressure, partial pressure, and inflow and outflow energy amounts of each of the members that are the intercooler, the air compressor, the oxidant gas outlet valve and the bypass valve.

Each of the members has portions where a large temperature change amount is observed, such as the inlet and outlet of the air compressor (a temperature increase due to adiabatic compression work), the inlet and outlet of the intercooler (a temperature decrease due to heat exchange with the cooling water) and the inlet and outlet of the fuel cell stack (a temperature increase due to heat generation by the fuel cell and heat exchange with the cooling water). By accurately controlling the temperature of the portions, the estimation accuracy of the flow resistance and the effective gas transport coefficient can be increased, whereby the gas flow rate and the gas pressure controllability are increased, and a deterioration in drivability and a reduction in the durability of the members can be suppressed.

Figure 4:
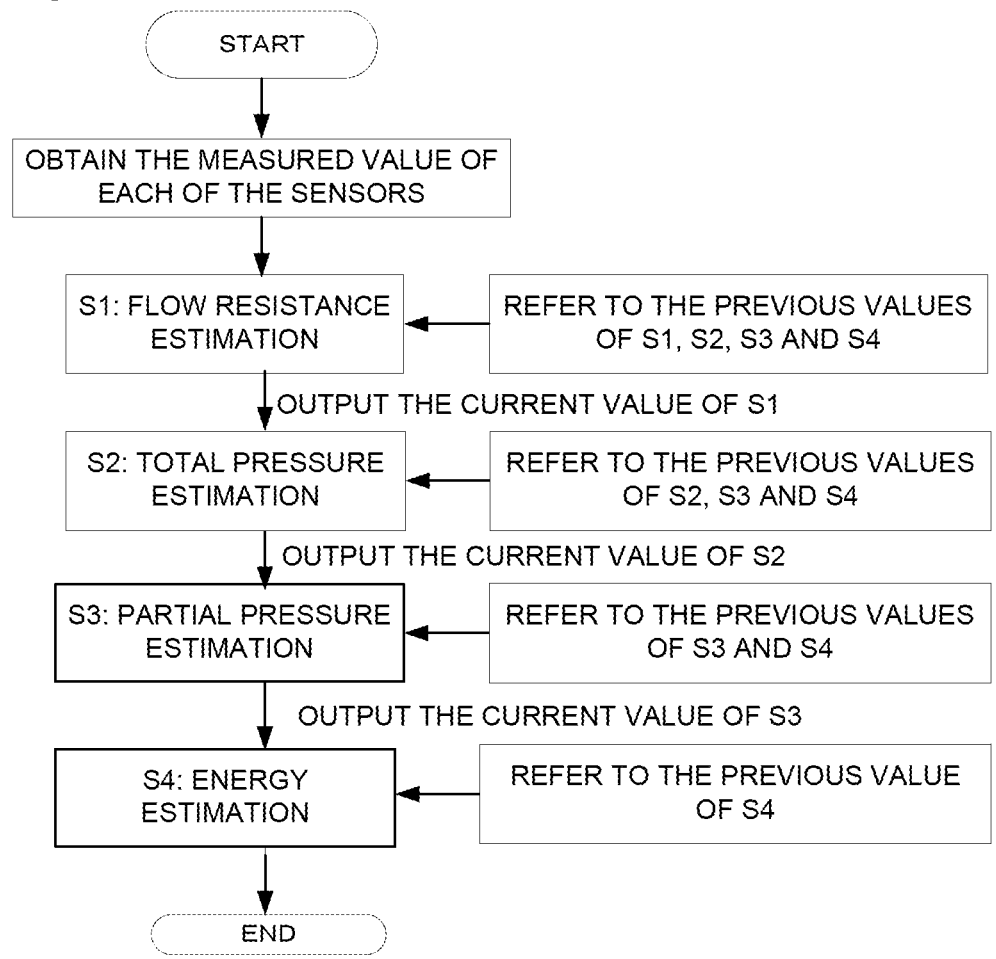
FIG. 4 is the flow chart of another example of the calculation process that is carried out by the calculator of the fuel cell system of the disclosed embodiments.

FIG. 4 is the flow chart of another example of the calculation process that is carried out by the calculator of the fuel cell system of the disclosed embodiments.

As shown in FIG. 4, since each of the calculations of the steps 1 to 4 is convergent calculation-less (that is, repeated calculation is not carried out until the calculation result enters a predetermined error range), a current value may be calculated with reference to a previous value.

Accordingly, the previous values of the flow resistance, total pressure, partial pressure and energy calculated in the previous steps 1 to 4 may be referred to in the step 1; the previous values of the total pressure, partial pressure and energy calculated in the previous steps 2 to 4 may be referred to in the step 2; the previous values of the partial pressure and energy calculated in the previous steps 3 and 4 may be referred to in the step 3; the previous value of the energy calculated in the previous step 4 may be referred to in the step 4; and the referential ratio of the previous values may decrease as the calculation proceeds in the order of the steps 1 to 4.

The reason for calculating the total pressure and partial pressure in this order in the steps 2 and 3, is because the partial pressure cannot be calculated unless the total pressure is determined. The reason for calculating the energy at the end is because, since temperature change is the slowest physical phenomenon among total pressure change, partial pressure change and temperature change, the calculation of the energy is least affected by a calculation error resulting from not referring to the previous value.

The next calculation time after the completion of the calculation, is not particularly limited. The calculation may be continuously carried out, or it may be carried out at a predetermined time and interval. It may be appropriately set.

The invention claimed is:

1. A fuel cell system comprising:
a fuel cell,
an air compressor configured to supply oxidant gas to the fuel cell,
an oxidant gas supply flow path connecting the fuel cell to the air compressor,
an oxidant gas discharge flow path configured to discharge cathode off-gas, which is discharged from the fuel cell, to the outside,
an oxidant gas outlet valve disposed in the oxidant gas discharge flow path to control pressure of the oxidant gas,
a bypass flow path branching from the oxidant gas supply flow path, bypassing the fuel cell and being connected to the oxidant gas discharge flow path,
a bypass valve disposed in the bypass flow path to control an opening state of the bypass flow path,
an atmospheric pressure sensor configured to measure atmospheric pressure,
an outside temperature sensor configured to measure outside temperature,
a flow rate sensor configured to measure a flow rate of the oxidant gas supplied from the outside to an inlet of the air compressor,
a rotational frequency sensor configured to measure a rotational frequency of the air compressor,
an angle sensor configured to measure an opening degree of each of the valves that are the oxidant gas outlet valve and the bypass valve,
an intercooler between the air compressor of the oxidant gas supply flow path and the fuel cell,
a controller, and
a calculator configured to estimate a flow resistance Zd, total pressure, partial pressure and energy of each of members that are the intercooler, the air compressor, the oxidant gas outlet valve and the bypass valve,
wherein the air compressor is a turbo-type air compressor, and
wherein the calculator is configured to perform:
a step 1 in which the calculator calculates the flow resistance Zd (Pa/(mol/sec)) of each of the members by a predetermined first calculation formula obtained by linearization of a relationship between a flow rate ndot (mol/sec) and a differential pressure $\Delta P$ (Pa) of each of the members, from the flow rate of the oxidant gas measured by the flow rate sensor, the atmospheric pressure measured by the atmospheric pressure sensor, the rotational frequency of the air compressor measured by the rotational frequency sensor, and the opening degree of each of the valves that are the oxidant gas outlet valve and the bypass valve measured by the angle sensor;
a step 2 in which, after the step 1, the calculator calculates the total pressure of each of the members by a predetermined second calculation formula for total pressure calculation, from the flow resistance Zd of each of the members, the flow rate of the oxidant gas measured by the flow rate sensor, the atmospheric pressure measured by the atmospheric pressure sensor, and the outside temperature measured by the outside temperature sensor;
a step 3 in which, after the step 2, the calculator calculates the partial pressure of each of the members by a predetermined third calculation formula for partial pressure calculation, from the total pressure of each of the members calculated in the step 2 and a ratio of each of components contained in the oxidant gas; and
a step 4 in which, after the step 3, the calculator calculates the energy of each of the members by a predetermined fourth calculation formula for energy calculation, from the flow rate of the oxidant gas measured by the flow rate sensor, the atmospheric pressure measured by the atmospheric pressure sensor, and the outside temperature measured by the outside temperature sensor.

2. The fuel cell system according to claim 1,
wherein, in the step 1, the calculator calculates an effective gas transport coefficient, and
wherein, in the step 2, when the differential pressure $\Delta P$ (Pa) of each of the members is equal to or less than a predetermined threshold value, the calculator calculates the total pressure of each of the members from a value obtained by multiplying the effective gas transport coefficient by a correction coefficient, the flow rate of the oxidant gas measured by the flow rate sensor, the atmospheric pressure measured by the atmospheric pressure sensor, and the outside temperature measured by the outside temperature sensor.

3. The fuel cell system according to claim 2,
wherein, in the step 1, when the opening degree of each of the valves that are the oxidant gas outlet valve and the bypass valve measured by the angle sensor is equal to or less than a predetermined threshold value, the calculator zeros the effective gas transport coefficient of the valves that the opening degree is equal to or less than the predetermined threshold value.

4. The fuel cell system according to claim 1, wherein the calculator corrects a partial pressure calculation result of each of the members calculated in the step 3 for a value obtained by multiplying a total pressure calculation result of each of the members calculated in the step 2 by a mole fraction of each of the components of the oxidant gas.

* * * * *